United States Patent [19]

Sivakumar et al.

[11] Patent Number: 5,589,075

[45] Date of Patent: Dec. 31, 1996

[54] USE OF SILICON CONTAINING POLYELECTROLYTES IN WASTEWATER TREATMENT

[75] Inventors: Ananthasubramanian Sivakumar, Naperville; John H. Collins, Bloomingdale; Manian Ramesh, Lisle, all of Ill.

[73] Assignee: Nalco Chemical Company, Naperville, Ill.

[21] Appl. No.: 565,479

[22] Filed: Nov. 30, 1995

[51] Int. Cl.$^6$ .................................................... C02F 1/56
[52] U.S. Cl. ........................ 210/727; 162/189; 210/734; 210/735; 210/917; 210/928
[58] Field of Search ........................ 162/189; 210/725, 210/727, 728, 734, 735, 917, 928

[56] References Cited

U.S. PATENT DOCUMENTS

| | | | |
|---|---|---|---|
| 3,624,019 | 11/1971 | Anderson et al. | 260/29.6 H |
| 4,151,202 | 4/1979 | Hunter et al. | 526/310 |
| 4,155,847 | 5/1979 | Tanaka et al. | 210/928 |
| 4,308,149 | 12/1981 | Selvarajan | 210/736 |
| 4,655,934 | 4/1987 | Rose et al. | 210/728 |
| 4,801,388 | 1/1989 | Fong et al. | 210/701 |
| 4,929,655 | 5/1990 | Takeda et al. | 524/458 |
| 5,006,590 | 4/1991 | Takeda et al. | 524/458 |
| 5,120,797 | 6/1992 | Fong et al. | 525/329.4 |
| 5,200,089 | 4/1993 | Siefert et al. | 210/725 |
| 5,209,854 | 5/1993 | Reed et al. | 210/928 |
| 5,283,306 | 2/1994 | Ramesh et al. | 526/312 |
| 5,292,793 | 3/1994 | Ramesh et al. | 524/555 |
| 5,314,627 | 5/1994 | Ramesh et al. | 210/734 |
| 5,338,816 | 8/1994 | Ramesh et al. | 526/312 |
| 5,435,921 | 7/1995 | Collins et al. | 210/917 |
| 5,476,522 | 12/1995 | Kerr et al. | 210/734 |

*Primary Examiner*—Peter A. Hruskoci
*Attorney, Agent, or Firm*—Robert A. Miller; James J. Drake; Patricia A. Charlier

[57] ABSTRACT

The invention is a process for removing color from a paper mill waste effluent containing color bodies which comprises: treating the waste effluent containing color bodies with an effective color-removing amount of a water-soluble silicon-containing copolymer coagulant prepared from diallyldimethylammonium halide and a vinyltrialkoxysilane; coagulating the color bodies present in the waste effluent; and then removing the coagulated color bodies from the waste effluent. The invention is also a method for clarifying waste water containing turbidity-causing components which comprises: adding to said water an effective turbidity-reducing amount of a water-soluble silicon-containing copolymer coagulant prepared from diallyldimethylammonium halide and a vinyltrialkoxysilane; mixing said copolymer and said water with a mechanical stirring device for sufficient time to allow flocculation of the turbidity-causing components; and then separating the flocculated turbidity-causing components from the waste water to obtain clarified water. Useful polymers for the practice of this invention are copolymers of diallyldimethylammonium halide and vinyltrialkoxysilane.

11 Claims, No Drawings

USE OF SILICON CONTAINING POLYELECTROLYTES IN WASTEWATER TREATMENT

FIELD OF INVENTION

The invention is a process for removing color from a paper mill waste effluent containing color bodies which comprises: treating the waste effluent containing color bodies with an effective color-removing amount of a water-soluble silicon-containing copolymer coagulant prepared from diallyldimethylammonium halide and a vinyltrialkoxysilane; coagulating the color bodies present in the waste effluent; and then removing the coagulated color bodies from the waste effluent. The invention is also a method for clarifying waste water containing turbidity-causing components which comprises: adding to said water an effective turbidity-reducing amount of a water-soluble silicon-containing copolymer coagulant prepared from diallyldimethylammonium halide and a vinyltrialkoxysilane; mixing said copolymer and said water with a mechanical stirring device for sufficient time to allow flocculation of the turbidity-causing components; and then separating the flocculated turbidity-causing components from the waste water to obtain clarified water. Useful polymers for the practice of this invention are copolymers of diallyldimethylammonium halide and vinyltrialkoxysilane.

BACKGROUND OF THE INVENTION

Many industrial processes require utilization of large amounts of water. In order to recycle this waste water, it must be treated before it can be reused. Effective recycling nay include the removal of turbidity-causing components from the waste water.

Turbidity-causing components can be any organic or inorganic species of sufficient particle or droplet size to create a turbid, light-dispersed appearance in waste waters, industrial waters, or natural waters. These turbidity-causing components can be of an inorganic nature, an organic nature, a pigment dispersion, a colloidal humic material suspension, sewage components, or admixtures of any of the above in any ratio in waters of any description thereby obtaining a turbid translucent effect.

Turbid waters are any type of waters having dispersed therein any type of turbidity-causing component, as described above, or any other type of turbidity-causing component which might be similar in effect when dispersed in these types of waters. For example, colloidal matter of either organic or inorganic or even mixed organic and inorganic character can be turbidity-causing. Such components may vary greatly in nature and concentration, but generally contain a highly anionic surface charge which causes the colloidal particles to repel one another, thus remaining dispersed in the water, rather than settling out in a reasonable time frame.

Examples of turbid waters include waste waters expelled from hydrocarbon processing plants, waste waters expelled from chemical processing plants which synthesize various types of rubber latexes, and effluent waters expelled from various kinds of processing plants using materials containing emulsified components which are of a hydrocarbon nature. Further, the waste waters may be from automotive plants or machining plant operations.

A common method for removal of suspended solids from various types of turbid waters is by the well-known chemical process of clarification. The primary unit operations in clarification are coagulation combined with or followed by flocculation. Coagulation is defined as destabilization of the solids through neutralization of the surface charge on particles or droplets dispersed in the water. Flocculation is defined as the agglomeration or coalescence of small particles or droplets into larger particles or droplets usually through bridging, generally called floc.

A method of clarification usually comprises addition to the aqueous solution to be treated of certain chemical additives known as coagulants, mixing of the chemical additive and aqueous liquid whereby floc formation occurs, and subsequent removal of this floc by a variety of methods. In some cases, the addition of a second higher molecular weight water-soluble polymer, generally known as a flocculant may aid in the formation of floc. The removal of floc may be achieved by mechanical separation means or by merely allowing forces of gravity to work upon the agglomerated solids whereby a removable sludge layer is created.

Among effective coagulants for this purpose are water-soluble cationic polymers. These materials function by neutralizing the charge on the surface of the dispersed particles or droplets which allow the turbidity-causing materials present in turbid waters to agglomerate or coalesce, and to settle, or float to the top of the aqueous medium where they are collected and removed by techniques familiar to the those skilled in the art.

For an example of effective coagulants, water-soluble cationic polymers in conjunction with polynuclear aluminum species for clarifying waters containing turbidity-causing components are disclosed in U.S. Pat. No. 4,655,934. Another example which discloses the reaction products of phenol, formaldehyde, and low molecular weight polyamines useful for removing turbidity from low turbidity industrial waste waters is disclosed in U.S. Pat. No. 4,308,149. However, more efficient processes for the removal of turbidity would represent an improvement over the prior art.

In addition to the removal of turbidity-causing components from waste water, many industrial processes necessitate removal of color before recycling of the water. Particularly, color removal from the effluent streams of paper mills presents a problem within the pulp and paper industry. It is necessary that these waste waters be treated for color removal prior to discharge.

The United States wood pulp production capacity is approximately 60 million tons per year. Since the average cellulose content of wood is about 40%, 150 million tons of wood are needed to produce this 60 million tons of pulp. The difference between these two numbers represents the lignin and hemicellulose which must be removed or separated in the pulping process in order to free the cellulose fibers.

The pulping process, however, does not remove 100% of the lignin present in the wood, with approximately 5% remaining after either Kraft or sulfite pulping (for mechanical pulping the amount is considerably higher). If a high grade paper is the desired end product, then this 5% residual lignin must be removed by bleaching the pulp.

Since over 35% of the pulp produced in the United States is bleached, there are about one million tons of lignin removed each year at the bleach plant, most of this in the caustic extraction stage. This number is significant because in the removal process (i.e., bleaching), most of this residual lignin is solubilized. This solubilized lignin is a strong absorber of visible radiation resulting from the conjugation of unsaturated and quinodal moieties formed during the oxidation step in the bleach plant. Consequently, the bleach plant effluent is highly colored. Although there are other sources of color in paper mill waste effluent, it is readily apparent that where bleaching is performed, its effluent can be expected to be the major contributor of waste color. Indeed, at Kraft bleach mills, the effluent from the first caustic extraction stage accounts for at least 70% of the waste color.

The goal of the pulping and bleaching operation is the removal of lignin and hemicellulose from the cellulose fiber in wood. The 95% that is removed by pulping is often burned as fuel in the process of recovering the inorganic chemicals present in the black liquor. In the bleaching operation, the 5% residual lignin is separated from the fibers by degradation and solubilization and ends up in the waste water. Chemical removal can therefore only be accomplished by reducing this solubility, which has proved to be a difficult task.

Therefore, the primary source of color in pulp is lignin. It has also been suggested that Kraft color is due to keto-enols produced from carbohydrates during the Kraft cook stage in the papermaking process. Chlorination of the pulp during the bleaching operation results in the formation of color bodies which are leached from the pulp by caustic alkali solutions. Thus, the caustic extract effluent contains a major proportion of the color bodies and the other organic materials which have to be disposed of during the waste water treatment.

The process of color removal from the effluent stream is further complicated by the presence of lime, solid particulate matter like pulp, clay, dispersant/surface active materials and polymers used during various stages in the papermaking process. The solid particulate matter is commonly referred to as anionic trash.

Most governmental regulations pertaining to color removal from the effluent stream of a papermaking process are directed to true color, i.e., platinum cobalt (Pt-Co) color using a DR2000 spectrophotometer). Nevertheless, there is increasing pressure on pulp and paper mills to lower the apparent color of the effluent water because that is the color visible to the naked eye. There are occasions when the true color of a system that has undergone treatment is low, but the corresponding apparent color is high. This problem is commonly caused by the presence of suspended particulate matter that causes an increase in the turbidity of the system. Therefore, it is important that any new treatment for color removal should not only remove the true color of the effluent, but should also lower the apparent color as well.

The pressure to remove color comes primarily from state environmental agencies. Previously, it was thought that the discharge of colored waste affected only the aesthetic value of the receiving body of water; however, biologists are becoming increasingly concerned about possible toxic effects, the effect of reduced light transmittance through the water causing reduced levels of photosynthetic activity, and of course, the resultant drop in dissolved oxygen concentration because of this drop in activity. Furthermore, although these colored, waste products are fairly refractory towards biological oxidation and since they become degraded in the aquatic environment, the oxidation products may be potentially harmful.

It has been shown that by-products are water soluble, and that a significant amount are produced. This puts severe demands on chemicals to be used for color removal. There are techniques already available, however, that can remove greater than 90% of the color from either total mill effluent or isolated waste streams, such as from the caustic extraction stage of the bleach plant. These techniques include chemical (e.g., alum, ferric, lime or polyelectrolytes), biological (e.g., white rot fungus) and physical processes (e.g., ultrafiltration, ion exchange and carbon absorption). However, none of these techniques enjoys widespread use due to prohibitive cost.

Chemical techniques for the removal of color include a decolorizing composition consisting of ferrous sulfate and a water-soluble cationic copolymer of epichlorohydrin and dimethylamine as disclosed in U.S. Pat. No. 5,200,089. Another example of a chemical treatment for the removal of color is a copolymer comprising diallyldimethyl ammonium chloride and a hydrophobic monomer selected from the group consisting of quaternized dimethylaminoethylacrylates and quaternized dimethylaminoethylmethacrylates as disclosed in U.S. Pat. Nos. 5,338,816; 5,283,306; 5,292,793 and 5,314,627.

The demands on a product used in a color removal application are quite severe, i.e., the product must be capable of reacting with the color bodies in a manner which results in their becoming insoluble and, because of the extremely large amount produced, the color removal product must work at very low weight ratios relative to the organic being removed or its use will be precluded by prohibitive costs.

SUMMARY OF THE INVENTION

The invention is a process for removing color from a paper mill waste effluent containing color bodies which comprises: treating the waste effluent containing color bodies with an effective color-removing amount of a water-soluble silicon-containing copolymer coagulant prepared from diallyldimethylammonium halide and a vinyltrialkoxysilane; coagulating the color bodies present in the waste effluent; and then removing the coagulated color bodies from the waste effluent. The invention is also a method for clarifying waste water containing turbidity-causing components which comprises: adding to said water an effective turbidity-reducing amount of a water-soluble silicon-containing copolymer coagulant prepared from diallyldimethylammonium halide and a vinyltrialkoxysilane; mixing said copolymer and said water with a mechanical stirring device for sufficient time to allow flocculation of the turbidity-causing components; and then separating the flocculated turbidity-causing components from the waste water to obtain clarified water. Useful polymers for the practice of this invention are copolymers of diallyldimethylammonium halide and vinyltrialkoxysilane.

DESCRIPTION OF THE INVENTION

The invention is a process for removing color from a paper mill waste effluent containing color bodies which comprises: a) treating the waste effluent containing color bodies with an effective color-removing amount of a water-soluble silicon-containing copolymer coagulant prepared from diallyldimethylammonium halide and a vinyltrialkoxysilane; b) coagulating the color bodies present in the waste effluent; and then c) removing the coagulated color bodies from the waste effluent. For the practice of this invention, the papermill waste effluent is treated with from about 1 to about 500 parts per million. Preferably, the papermill waste effluent is treated with from about 30 to about 200 parts per million. Most preferably, the papermill waste effluent is treated with from about 50 to about 120 parts per million. The invention is also a method for clarifying waste water containing turbidity-causing components which comprises: a) adding to said water an effective turbidity-reducing amount of a water-soluble silicon-containing copolymer coagulant prepared from diallyldimethylammonium halide and a vinyltrialkoxysilane; b) mixing said copolymer and said water with a mechanical stirring device for sufficient time to allow flocculation of the turbidity-causing components; and then c) separating the flocculated turbidity-causing components from the waste water to obtain clarified water. For the practice of this invention, the waste water is treated with from about 0.1 to about 500 parts per million of the water-soluble silicon-containing copolymer coagulant. Preferably, the waste water is treated with from about 0.5 to about 100 parts per million of the water-soluble silicon-containing copolymer coagulant. Most preferably, the waste water is treated with from about 2 to about 30 parts per million of the water-soluble silicon-containing copolymer coagulant.

The vinylalkoxysilane monomers useful in the copolymer composition of the invention contain an alkyl group of from 1–4 carbon atoms. As such vinyltrimethoxy, triethoxy, tripropoxy and tributoxysilanes, and combinations thereof, may find use in the subject invention. While vinyltrialkoxysilanes are preferred, the monomers may be mono or di-substituted as well, or mixtures of mono-, di- and tri-alkoxy substituted silanes may be used. A preferred vinyltrialkoxysilane for use in this invention is vinyltrimethoxysilane. Vinyltrimethoxysilane is commercially available from the Dow Corning Corporation; Midland, Mich.; and from Hüls America, Piscataway, N.J.

Useful vinylalkoxysilanes may include vinyltrimethoxysilane, vinyltriethoxysilane, vinyltris(β-methoxyethoxy)silane, vinyltriacetoxysilane, allyltrimethoxysilane, allyltriacetoxysilane, vinylmethyldimethoxysilane, vinyldimethoxyethoxysilane, vinylmethyldiacetoxysilane, vinyldimethylacetoxysilane, vinylisobutyldimethoxysilane, vinyltriisopropoxysilane, vinyltri-n-butoxysilane, vinyltrisecbutoxysilane, vinyltrihexyloxysilane, vinylmethoxydihexyloxysilane, vinyldimethoxyoctyloxysilane, vinylmethoxydioctyloxysilane, vinyltrioctyloxysilane, vinylmethoxydilauryloxysilane, vinyldimethoxylauryloxysilane, vinylmethoxydioleyoxysilane, vinyldimethoxyoleyloxysilane, and polyethyleneglycol-modified vinylsilane represented by the formula

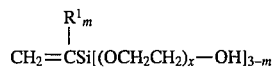

(where $R^1$ and m are as defined above, and x is 1 to 20.)

Diallyldimethylammonium halides, especially diallyldimethylammonium chloride are well-known and commercially available from a variety of sources. One method for the preparation of DADMAC is detailed in U.S. Pat. No. 4,151,202, the disclosure of which is hereinafter incorporated by reference into this specification.

The mole ratio of DADMAC to the vinyltrialkoxysilane ranges from 99.99:0.01 to 80:20 and, preferably from 99.9:0.1 to 85:15. Most preferably, the mole ratio of DADMAC to the vinyltrialkoxysilane range from 99.9:0.1 to 95.0:5.0.

The polymers may be prepared as in conventional vinyl polymerization techniques. These techniques include conventional solution polymerization in water, and polymerization in water-in-oil emulsion form, such as that described in U.S. Pat. No. 3,624,019, the disclosure of which is hereinafter incorporated by reference into this specification. The polymers of the invention may also be prepared in so-called dispersion form, such as that described in U.S. Pat. Nos. 4,929,655 and 5,006,590 the disclosures of which are also hereinafter incorporated by reference into this specification.

Conventional free radical catalysis may be used including both free radical initiators and red-ox systems. Such polymerizations are within the purview of those skilled in the art and as such will not be elaborated on in this specification.

The molecular weights of the copolymer prepared hereunder can vary greatly. Generally, copolymers of diallyldimethylammonium chloride and vinyltrimethoxysilane produced hereunder will have a molecular weight of from 50,000 to 5,000,000, and preferably 100,000 to 2,500,000, and most preferably from 150,000 to 1,500,000. The polymers of this invention will accordingly have a reduced specific viscosity for a one percent polymer solution as measured in one molar sodium nitrate of from 0.2–5 dl/gm and preferably from 0.5–4.0 dl/gm. A most preferred reduced specific viscosity range is from 0.7–3.0 dl/gm. While discussed herein as copolymers of diallyldimethylammonium halides and vinylalkoxysilanes, other monomers may be incorporated into the resultant polymers without detracting from the spirit and intent of the invention. Possible monomers that may be incorporated include, but are not limited to polymerizable nonionic, and cationic vinyl monomers. These materials are exemplified by acrylamide, and such cationic monomers as dimethylaminoethylmethacrylate and dimethylaminoethyl acrylate and their respective water soluble quaternary ammonium salts.

The copolymers of this invention may be used alone, or in combination with a high molecular weight anionic or non-ionic water soluble or dispersible flocculant. Such polymers include polyacrylamide, and copolymers of acrylamide with acrylic acid and its water soluble alkali metal or ammonium salts. As used herein, the term acrylic acid is meant to encompass such water soluble salts. Also useful are such polymers as sulfomethylated acrylamides as exemplified in U.S. Pat. Nos. 5,120,797 and 4,801,388, the disclosures of which are hereinafter incorporated by reference into this specification. Other commercially available anionic flocculant materials may also be utilized.

A preferred class of flocculants for use in this invention includes copolymers of acrylamide and acrylic acid having a mole ratio of acrylamide to acrylic acid of from 99:1 to 1:99 and preferably 99:1 to 50:50. Most preferably, the mole ratio of acrylamide to acrylic acid will be 95:5 to 60:40. An especially preferred flocculant for use in this invention has a mole ratio of acrylamide to acrylic acid of about 70:30.

The flocculants of this invention may be prepared in solution form, or in water-in-oil emulsion form. The preparation of such flocculants is known to those skilled in the art. The flocculants generally have molecular weights ranging from as low as 1,000,000 to 40,000,000 or higher. Preferred flocculants have a molecular weight of about 10,000,000. The upper weight of molecular weight is not critical so long as the polymer is water soluble or dispersible.

The following examples are presented to describe preferred embodiments and utilities of the invention and are not meant to limit the invention unless otherwise stated in the claims appended hereto.

EXAMPLE 1

A 90:10 mole copolymer of diallyldimethylammonium chloride (DADMAC) and vinyltrimethoxysilane (VTMS), at 20% actives, was prepared for use as a coagulant. The following reactants were used to form the silicon containing polyelectrolyte copolymer coagulant:

| | |
|---|---|
| 312.91 grams | Diallyldimethylammonium Chloride DADMAC (a 58% Solution) |
| 18.89 grams | Vinyltrimethoxysilane (a 98% Solution) |
| 200.0 grams | Deionized Water |
| 1.80 grams | [2,2'-Azobis (2-amidinopropane)] Dihydrochloride Initiator |
| 20.0 grams | Sodium Chloride |

| 446.20 | Final Dilution Water |
| 0.1 grams | Versene |

A semi-batch process was used to prepare the DADMAC/VTMS copolymer.

A 1.5 L reactor equipped with a mechanical stirrer a thermocouple, nitrogen inlet/outlet tubes, condenser and two syringe pumps was set up. Vinyltrimethoxysilane was taken in the first pump which was set at a delivery rate of 4.5 cc/hr. The second pump contained an aqueous solution of 2,2'azobis (2-amidinopropane) dihydrochloride (1.2 g in 48.8 g DI water), and the pump was set at 12.5 cc/hr.

The DADMAC, sodium chloride, and Versene were charged into a polymerization reactor and heated to 52° C. The reaction mixture was purged with nitrogen. VTMS and initiator-containing pumps were started and the polymerization was allowed to proceed.

A thick polymer started forming after about 2 hours. At the end of two and a half hours, the viscosity increased to a point where continued agitation was difficult. 200 ml of deionized water was then added. The reaction continued for a period of 5 hours, and then subjected to a post treatment at 82° C. for 5 hours.

Product phase separated in two days and indicated extensive crosslinking as shown below:

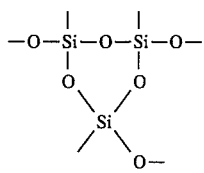

The phase-separated product swelled in water, yet was water-insoluble.

EXAMPLE 2

A 99.5/0.5 mole ratio copolymer of diallyldimethylammonium chloride (DADMAC) and vinyltrimethoxysilane (VTMS), at 20% actives, was prepared for use as a coagulant. The following reactants were used to form the silicon containing polyelectrolyte copolymer coagulant:

| 321.13 grams | DADMAC (a 62% Solution) |
| 1.00 grams | VTMS (a 98% Solution) |
| 0.2 grams | Versene |
| 258.8 grams | Deionized Water |
| 1.20 grams | 2,2'-Azobis [2(2-imdazolin-2yl) propane Dihydrochloride Initiator |
| 61.00 grams | Sodium Chloride |
| 356.87 grams | Dilution Water |

A batch process was used to prepare the DADMAC/VTMS copolymer. A reactor similar to the one described in Example 1 was used.

The DADMAC, VTMS, Versene, sodium chloride and deionized water were charged into a polymerization reactor at a temperature of 58° C. Thereafter, the initiator (0.6 grams in 49.4 grams deionized water) was charged into the reactor dropwise via a syringe pump at 12.5 cc/hour.

A thick polymer started forming after about 1.0 hour. At the end of 1.5 hours, the mixture was difficult to stir. At this point, deionized water addition was started using a syringe pump set at 70 ml/hour. The reaction continued for a period of 5.5 hours. After that, initiator (0.6 grams in 19.4 grams of deionized water) was added. The reactor was heated to 82° C. and held at that temperature for 3 hours. The reaction product was then diluted with 356.87 grams of water and stored. Reduced specific viscosity and intrinsic viscosity measurements were determined on a 1% polymer solution in $NaNO_3$ (sodium nitrate) and found to be 2.02 and 1.3 dl/gm respectively.

EXAMPLE 3

A 99.0/1.0 mole ratio DADMAC/VTMS copolymer was prepared using the procedure of Example 2. 2.0 g of VTMS and 355.07 g of DI water were used in place of the amounts in Example II. All other quantities were the same. RSV/IV for a 1% by weight solution of the polymer in sodium nitrate were 2.2 and 1.2 dl/g, respectively.

EXAMPLE 4

A 99.0/1.0 mole ratio copolymer of diallyldimethylammonium chloride (DADMAC) and vinyltrimethoxysilane (VTMS), at 20% actives, was prepared for use as a coagulant. The following reactants were used to form the silicon containing polyelectrolyte copolymer coagulant:

| DADMAC (monomer) 40% solution | 495.00 g |
| VTMS (vinyltrimethoxysilane) | 2.00 g |
| Versene | 0.20 g |
| Ammonium Persulfate (APS) | 3.90 g |

| Deionized Water | 20.00 g |
| Ammonium Persulfate (APS) | 1.90 g |
| Deionized Water | 20.0 g |
| Dilution Water | 195.00 g |
| Final Water | 262.90 g |
| Sodium bisulfite | 1.00 g |
| | 1,000.00 g |

1. Versene, and DADMAC monomer were taken in a conventional polymer reactor as described in Example 1.
2. The reactor was heated to 57° C. under constant $N_2$ purging, and stirred at 400 rpm.
3. VTMS was added immediately followed by the APS solution (2.0g in 20 g water).
4. The reactor was held at 57° C. for 3 hours. During this period, dilution water (195 g) was added at a rate of 65 g/hr.
5. The reactor was then heated to 82° C.; and a solution of APS (0.97 g) in water (10 g) was added.
6. After holding at 82° C. for 2 hours, the reactor was cooled to room temperature. Sodium bisulfite was added to prevent degradation to the reactor and mixed for 15 min.
7. The product was transferred into a storage container.

Reduced specific viscosity and intrinsic viscosity measurements were determined on a 1% polymer solution in $NaNO_3$ (sodium nitrate) and found to be 1.6 and 0.9 dl/gm respectively.

EXAMPLE 5

The polymer at the desired concentration was added to the wastewater and mixed at 330 rpm for 1 minute followed by mixing at 80 rpm for 5 minutes. The particles are then allowed to settle for 10 minutes. The supernatant is then collected for analysis of apparent color (AC) and true color (TC). The apparent color is determined by measuring the absorbance of the supernatant at 465 nm using a Hach DR-2000 unit. The true color is determined by adjusting the pH of the supernatant to 7.6, filtering it through a 0.8 micron filter and then measuring the absorbance at 465 nm. The unit of measurement for both parameters is Pt-Co. Both the measurements are used at industrial facilities to evaluate the performance of the polymers. The data in Table I was obtained by experimentation on wastewater from on a Southeastern paper mill.

The conventional treatment using a solution poly(DADMAC) was compared to the copolymer of the instant invention. Both poly(DADMAC) and poly(DADMAC/VTMS) tested had similar molecular weights. Lower numbers indicate presence of less color contaminants. In each case, after a certain point the polymers were overdosed, such that color counts actually increased. For both apparent and true color, poly(DADMAC/VTMS) provided greater color removal at lower dosage levels.

TABLE I

| | Color Removal | | | |
|---|---|---|---|---|
| | poly(DADMAC) | | poly(DADMAC/VTMS)[1] | |
| Dosage (ppm) | Apparent Color | True Color | Apparent Color | True Color |
| 50 | | | 1509 | |
| 60 | | | 1237 | 192 |
| 70 | | | 616 | 165 |
| 75 | 1992 | | | |
| 80 | | | 585 | 156 |
| 90 | 1150 | 190 | 575 | 152 |
| 100 | | | 576 | 149 |
| 105 | 841 | 156 | | |
| 110 | | | 6og | 140 |
| 113 | 817 | 146 | | |
| 120 | 640 | 161 | 694 | 132 |
| 135 | 701 | 135 | | |
| 140 | | | 871 | |
| 143 | 848 | 130 | | |
| 150 | 1006 | 120 | | |
| 160 | | | 1152 | |

[1]The polymer was prepared according to the procedure described in Example III.

EXAMPLE 6

The polymer was added to the wastewater at the desired concentration and mixed at 330 rpm for 1 minute, followed by mixing at 50 rpm for 2.5 minutes and 2.5 minutes of settling. The supernatant was then analyzed for turbidity expressed as NTU using a Hach turbidimeter.

The data in Table I was obtained by experimentation on wastewater from an industrial facility in the Northwest.

A comparison of the conventional solution poly(DADMAC) treatment to the copolymers of the instant invention was performed. Poly(DADMAC/VTMS) was much more efficient at turbidity removal, as evidenced by lower NTU readings at comparable dosages.

TABLE II

| | Turbidity (NTU) | |
|---|---|---|
| Dosage (ppm) | poly(DADMAC) | poly(DADMAC/VTMS)[1] |
| 2 | | 101 |
| 2.5 | 117 | |
| 3 | | 64.5 |
| 3.75 | 84 | |

TABLE II-continued

| | Turbidity (NTU) | |
|---|---|---|
| Dosage (ppm) | poly(DADMAC) | poly(DADMAC/VTMS)[1] |
| 4 | | 33.4 |
| 4.5 | 49 | |
| 5 | | 37.2 |
| 5.25 | 48 | |
| 6 | 54 | 19.4 |
| 6.75 | 33 | |
| 7 | | 21.4 |
| 8.25 | 36 | |
| 9 | | 19.9 |
| 9.75 | 33.2 | |
| 11 | | 19.4 |

[1]The polymer was prepared according to the procedure described in Example IV.

Changes can be made in the composition, operation and arrangement of the method of the present invention described herein without departing from the concept and scope of the invention as defined in the following claims:

We claim:

1. A process for removing color from a paper mill waste effluent containing color bodies which comprises:
   a) treating the waste effluent containing color bodies with an effective color-removing amount of a water-soluble silicon-containing copolymer coagulant prepared from diallyldimethylammonium halide and a vinyltrialkoxysilane wherein said copolymer has a reduced specific viscosity in one molar sodium nitrate solution for one percent polymer actives from 0.2 to 5 dl/gm and the mole ratio of diallyldimethylammonium halide to vinyl trialkoxysilane ranges from 99:9:0.1 to 80:20;
   b) coagulating the color bodies present in the waste effluent; and then
   c) removing the coagulated color bodies from the waste effluent.

2. The method of claim 1 wherein the diallyldimethylammonium halide is diallyldimethylammonium chloride and the vinylalkoxylsilane is vinyltrimethoxysilane.

3. The method claim 2 wherein the coagulant has a reduced specific viscosity in one molar sodium nitrate solution for one percent polymer actives from 0.5 to 4.0 dl/gm.

4. The method of claim 2 wherein the coagulant has a reduced specific viscosity in one molar sodium nitrate solution for one percent polymer actives from 0.7 to 3.0 dl/gm.

5. The method of claim 2 wherein the mole ratio of diallyldimethylammonium chloride to vinyltrimethoxysilane ranges from 99.9:0.1 to 85:15.

6. The method of claim 2 wherein the mole ratio of diallyldimethylammonium chloride to vinyltrimethoxysilane ranges from 99.9:0.10 to 95.0:5.0.

7. The method of claim 2 wherein the papermill waste effluent is treated with from about 1 to about 500 parts per million.

8. The method of claim 2 wherein the papermill waste effluent is treated with from about 30 to about 200 parts per million.

9. The method of claim 2 wherein the papermill waste effluent is treated with from about 50 to about 120 parts per million.

10. The method of claim 2 further comprising the addition of a flocculant to said waste water.

11. The method of claim 10 wherein said flocculant is a copolymer of acrylamide and acrylic acid.

* * * * *